United States Patent [19]

Levy

[11] 4,072,432
[45] Feb. 7, 1978

[54] CONNECTOR FOR TUBULAR FRAME MEMBERS

[75] Inventor: Paul M. Levy, Skokie, Ill.

[73] Assignee: Capitol Hardware Manufacturing Company, Inc., Chicago, Ill.

[21] Appl. No.: 683,819

[22] Filed: May 6, 1976

[51] Int. Cl.² ............................................. F16B 7/22
[52] U.S. Cl. .................................. 403/170; 403/176
[58] Field of Search ................................. 403/169–174, 403/176–178, 231, 401, 402, 405, 406, 343; 52/758 H, 753 C, 753 D

[56] References Cited

U.S. PATENT DOCUMENTS

| | | | |
|---|---|---|---|
| 3,283,639 | 11/1966 | Holton | 403/343 X |
| 3,532,369 | 10/1970 | Reilly | 403/176 |
| 3,666,298 | 5/1972 | Reilly | 403/172 |

FOREIGN PATENT DOCUMENTS 1,011,688  12/1965  United Kingdom ................. 403/178

Primary Examiner—Wayne L. Shedd
Attorney, Agent, or Firm—Wallenstein, Spangenberg, Hattis & Strampel

[57] ABSTRACT

A framework joint comprises a square open-ended tube and a connector fitting comprising a preferably cubical hub portion having a tube-receiving projection or post extending from one of two or more faces thereof having a similar projection. Each tube-receiving projection has diametrically opposed portions of maximum spacing adapted frictionally to engage the opposed flat inner surfaces of a square tube and diametrically opposing portions of lesser spacing between said portions of maximum spacing and which provide clearance for the passage of a flexible resilient locking tongue inclining inwardly and axially from the wall of the square tube. The locking tongue preferably has a convex shape to be engageable by the recessed radially outwardly facing surface of a groove formed in the associated tube-receiving projection of the connector fitting. The tongue initially is located over the projection portions of lesser spacing and extends beyond the outer margin of a projection groove when a tube and connector fitting projection are initially loosely telescoped together. The tongue is deformed into the groove by the force imparted by the recessed groove surface when the tube or connector fitting is rotated 45°, and the deformed tongue draws the connector fitting and tube axially together.

12 Claims, 14 Drawing Figures

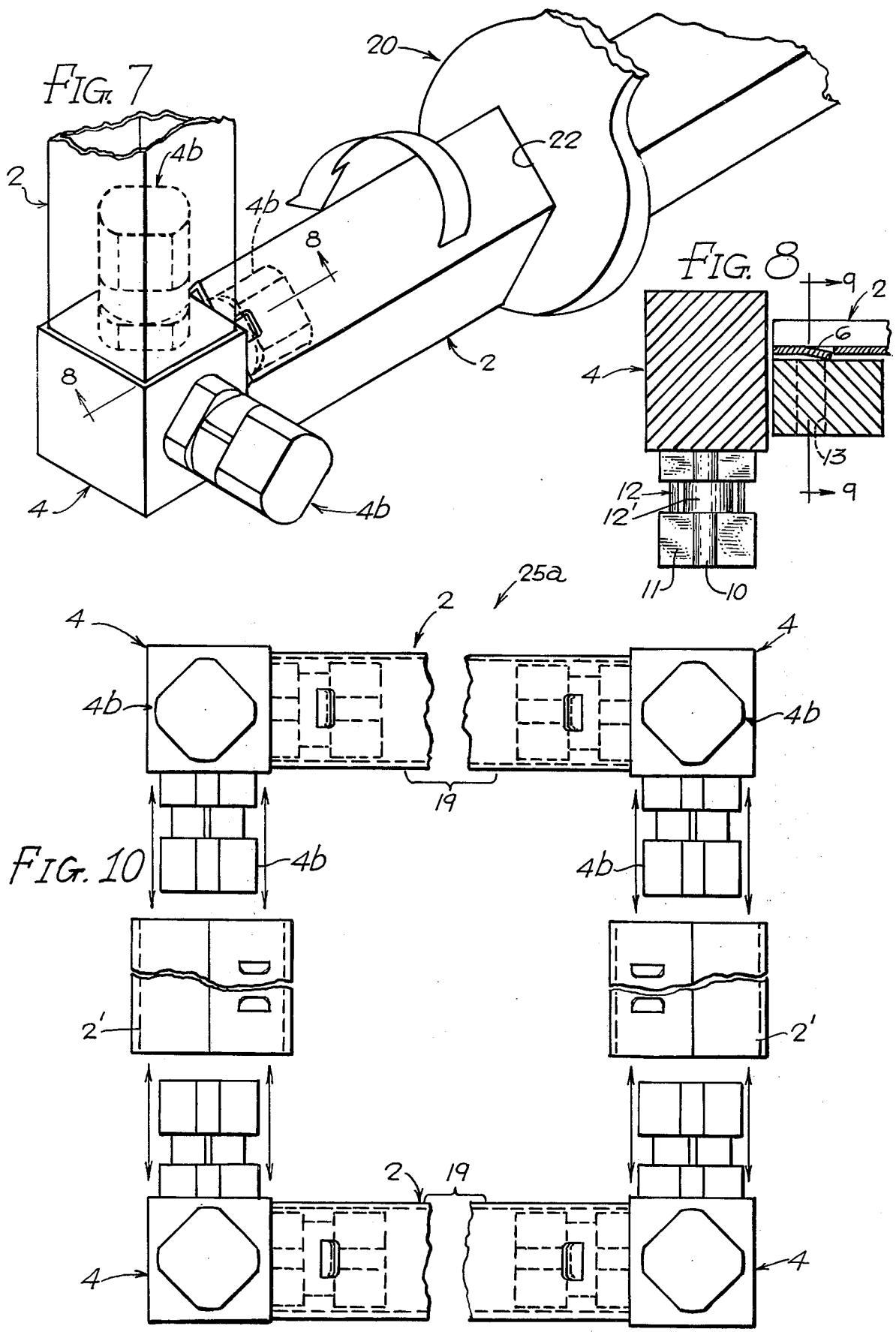

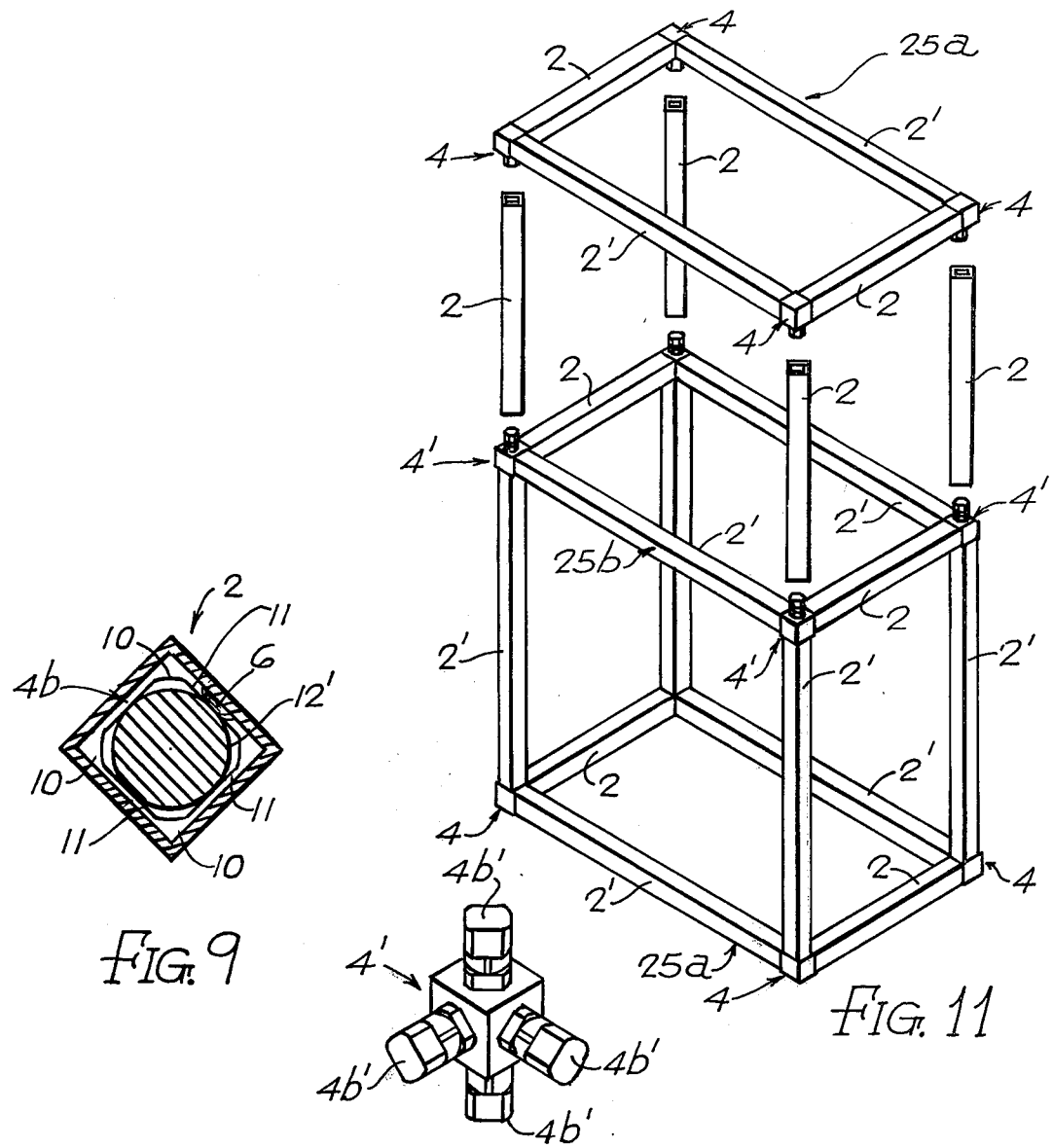
FIG. 9
FIG. 12
FIG. 11
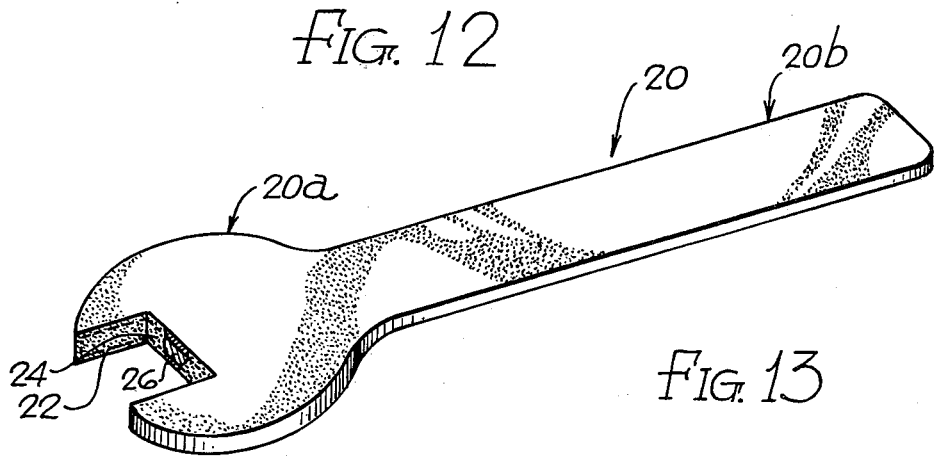
FIG. 13

CONNECTOR FOR TUBULAR FRAME MEMBERS

BACKGROUND OF THE INVENTION

The present invention relates to a unique knock-down framework joint which offers limitless arrangements for storage and display racks, exhibit booths, and the like, for department store merchandizing, office, laboratory, institutional and do-it-yourself home applications.

Various knock-down framework arrangements have been heretofore developed which utilize a connector joint or fitting to interconnect square tubes which fitting has a cubical hub from which outwardly extends from two or more faces thereof tube-receiving projections or posts. Each of the tube-receiving projections on initial assembly with a tube fits loosely within an open end of the tube in one angular position of insertion thereof, and tightly frictionally engages the inner defining walls of the tube when the tube or fitting is rotated 45° from its initial position. Examples of such knockdown frameworks are disclosed, for example, in U.S. Pat. No. 3,532,369, granted Oct. 6, 1970, and British Pat. No. 1,011,688, granted Dec. 1, 1965. To prevent the withdrawal of the interconnected parts from their supposed tightly fitting positions by a force tending to separate the parts longitudinally, a locking tongue is sometimes provided on each end of the tube which tongue fits into a groove formed in the associated tube-receiving projection. However, this licking tongue heretofore served the sole purpose of preventing the separation of the parts in a longitudinal direction.

In the commercial forms of the knock-down frameworks shown in the patents described, at least one or both of the inter-fitting surfaces, generally the outermost surfaces of the tube-receiving projections of the connector fitting, are made of a synthetic plastic material. Such a plastic material is subject to wear and dimensional instability which affects adversely the reliability thereof over long periods of use. Also the tolerances utilized in the manufacture of the connector fittings and the square tubes were such that the telescoping parts thereof sometimes did not fit tightly together as desired, resulting in a weak or wobbly framework.

Another deficiency of the prior art knock-down frameworks of the type described is that frequently the ends of the square tubes did not fit snugly and neatly against the faces of the cubical hubs of the connector fittings, leaving unsightly openings thereat.

It is, accordingly, one of the objects of the invention to provide an improved knock-down framework joint of the general type described above which, when the telescoping tube-receiving projections of the connector fittings and the square tubes are in their tightly fitting positions, they will always fit snugly together even when made with only modestly stringent manufacturing tolerances.

A further object of the invention is to provide a knock-down framework joint of the type described wherein the relative rotation of the initially loosely fitting telescoping parts into a joint locking position automatically draws the square tube involved snugly against the face of the cubical hub of the connector fitting, so that no unsightly gaps are visible between the tube and the connector fitting.

A still further object of the invention is to provide a knock-down framework joint as described wherein the parts thereof, even after repeated assembly and disassembly thereof, continue to form a secure, tightly fitting joint.

SUMMARY OF THE INVENTION

In accordance with the most preferred heavy duty form of the invention, unlike most of the similar commercial forms of prior art knock-down framework joints described, all the engaging parts of the framework joints are made of metal, preferably steel, so that very secure, long lasting, tight fitting joints result. However, the most important unique feature of the invention, which does not require that the parts thereof be made of metal, is that the projections of the fittings are uniquely designed to receive locking tongues or projections extending inwardly from the adjacent end of the square tubes in a manner so that, upon rotation of the parts into their tightly fitting telescoping positions, the tube and connector fitting are drawn axially together so that the end of the square tube involved will be brought tightly against the hub portion of the connector fitting.

While the parts of the invention for tightly loaded frameworks could be made of cast metal or molded synthetic plastic parts, it is most advantages to make the same of steel. Thus, the hub portion of each connector fitting is a preferably solid cubical block of steel, and each tube-receiving projection thereof is of solid steel welded to the hub portion and formed automatically by well-known machine tool equipment which forms its outer surfaces in the form of a grooved truncated cylinder (although the broader aspects of the invention do not require such a shape). The truncated cylinder provides four equally spaced cylindrical surface portions forming two pairs of diametrically opposed portions of maximum spacing, between which extend diametrically opposed portions of lesser spacing formed by the flat truncated surfaces. The diametrically opposed portions of maximum spacing are aligned in directions parallel to the margins of the square face of the cubical hub portion from which the projection extends and the diametrically opposed portions of lesser spacing thereof are aligned and centered with respect to the diagonals of this face.

An annular groove is formed on each tube-receiving projections, preferably at a point spaced between the ends thereof, the innermost surface of the groove being a recessed radially outwardly facing cylindrical surface coaxial with the outer cylindrical surfaces of the tube-receiving projection. The flat truncating surfaces preferably intersect and truncate the recessed grooved surface, so that the groove surface forms a tongue-deforming means, functioning in the manner to be described.

Cooperating with the groove formed in each tube-receiving projection of the connector fitting being described is an inwardly projecting flexible resilient locking means struck or otherwise provided on each end of the square tubes. While this locking means may have a variety of shapes and constructions, in its most preferred form it is a tongue struck from the square tube so that it inclines inwardly and axially of the tube.

When a square tube is inserted over the tube-receiving projection of a connector fitting of the invention, the sides of the square tube make an angle of 45° to the margin of the square face of the cubical hub portion of the connector fitting from which the projection involved extends, so that the tube and fitting projection are in their loosely fitting positions and the diametrically opposed portions of lesser spacing of the fitting projection form clearance for the ready passage of the tube locking tongue therealong. If the end of the square tube should be moved to a point where it abuts the square face of the cubical hub portion of the connector fitting, the end of the locking tongue will still extend slightly axially beyond the point of the fitting projection where the outer margin of the groove formed on the tube-receiving projection is located. When the tube is rotated 45° easily with a wrench, the recessed curved surface of the groove, which is spaced further from the center of the fitting projection that the flat diametrically opposed portions of lesser spacing thereof, acts as a camming, tongue-deforming surface which engages the side of the tongue to deform it. The tongue slips into the groove and bears against the outermost margin thereof, which forms a bearing shoulder for the tongue. To enable the tongue to be readily deformed into this position, the tongue preferably has a convexly shaped cross-section extending transversely of the longitudinal axis, to present laterally facing curved side faces, so that the recessed curved inner surface of the groove readily engages a side face of the tongue and deforms the same inwardly as described. The resiliency of the deformed tongue bearing against the shoulder formed by the projection groove creates an axial force which draws the end of the square tube tightly against the face of the cubical hub of the connector fitting. The deformation of the tube locking tongue into the fitting projection groove occurs even when the tube end is not initially positioned fully against the hub face of the fitting. In those cases where the manufacturing tolerances are such that the diametrically opposed portions of maximum spacing of the tube-receiving projection and the inner surfaces of the rectangular tube do not fit as tightly together as desired, the resilient interfitting connection between the tongue and the defining walls of the groove described will provide the necessary locking action to provide a securely fitting framework joint.

The above and other advantages and features of the invention will become apparent upon making reference to the specification to follow, the claims and the drawings.

DESCRIPTION OF DRAWINGS

FIG. 7 is a view showing the assembly of the parts shown in FIG. 1 wherein the tube therein is being rotated 45° relative to the connector fitting from an initially loosely fitting to a tightly fitting relationship;

FIG. 8 is a fragmentary 45° angle sectional view through the assembly of the tube and connector fitting shown in FIG. 7, taken along sectional line 8—8 therein;

FIG. 9 is a transverse sectional view through the assembly of FIG. 8, taken along section line 9—9 thereof;

FIG. 10 is a view showing the manner in which a pair of framework sub-assemblies like that shown in FIG. 1 are applied to a pair of square tubes shown in fragmentary form, to form a horizontal end frame section for the framework shown in FIG. 11;

FIG. 11 is a partially exploded perspective view of a framework comprising a pair of horizontal end frame sections like that shown in FIG. 10 and an intermediate horizontal frame section having four-way connector fittings which join the same to vertical square tubes extending to the end frame sections.

FIG. 12 is a perspective view of the four-way connector fittings used in the intermediate horizontal frame assembly of the framework of FIG. 11; and FIG. 13 is a perspective view of the synthetic plastic coated wrench used to assemble the various parts of the framework shown in FIG. 11.

PREFERRED EMBODIMENT OF THE INVENTION SHOWN IN THE DRAWINGS

Figure 1:
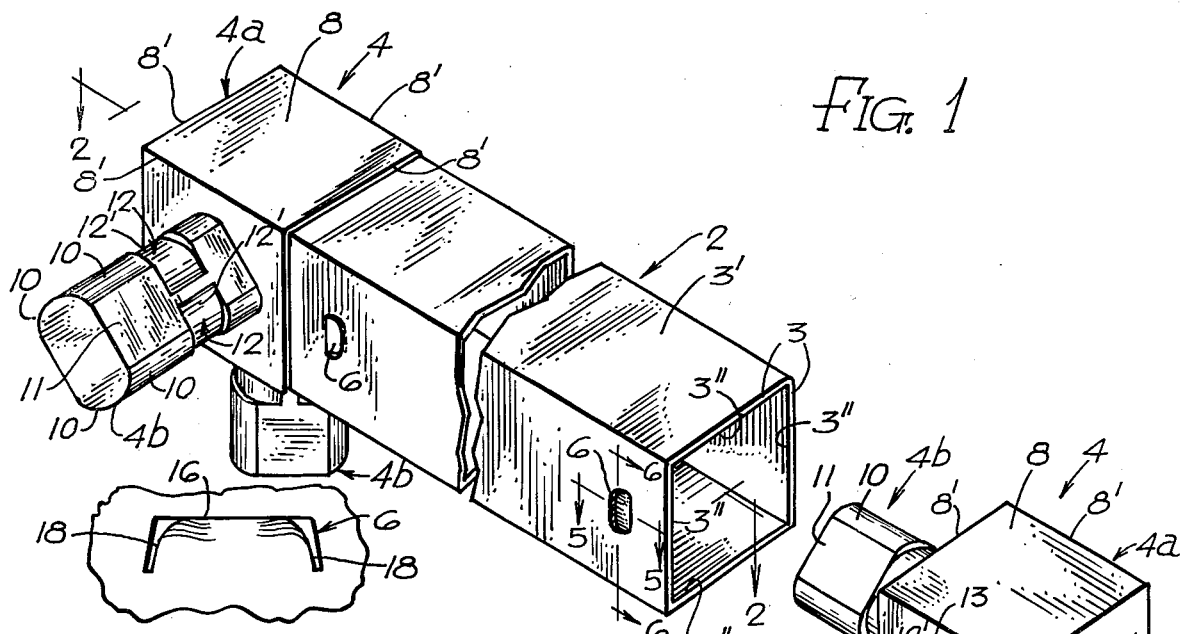
FIG. 1 is a perspective, fragmentary view of a framework sub-assembly of the invention comprising a square tube having a three-way end connector corner fitting locked into one end of the tube and a similar corner fitting separated from the opposite end of the tube.

The present invention provides a unique framework joint which can be made in a number of different configurations. FIG. 1 shows a pair of three-way corner connector fittings 4—4, one of the connector fittings being locked within the end of a square tube 2 and the other connector fitting being removed from the opposite end of the tube, better to show the construction thereof. The square tube 2 has two pairs of oppositely disposed walls 3 defining on the inside of the tube two pairs of orthogonally related parallel flat surfaces 3"—3" which are unobstructed except for a pair of tongues 6—6 punched inwardly from one of the walls 3 at a point contiguous to but spaced from the end edges of the tube. The three-way connector fittings 4—4 each have a cubical hub portion 4a having six identical square faces 8. Three tube-receiving projections or posts 4b—4b—4b extend respectively from the central portions of three contiguous faces of the cubical hub portion 4a thereof. The tube-receiving projections have outermost dimensions substantially smaller than the hub face 8 from which they extend. The outermost surfaces of these projections preferably have the shape of a truncated cylinder. According, the outermost surfaces extending axially of each tube-receiving projection 4b have two pairs of curved surfaces 10—10 and 10—10 falling along the outlines of a common cylinder coaxial with the longitudinal axis of the tube receiving projection involved. The surfaces 10—10 are interconnected by diametrically opposed pairs of surfaces 11—11 and 11—11 of lesser spacing than the surfaces 10—10 and which, in the preferred form of the invention, are flat surfaces. The pairs of surfaces 10—10 are spaced apart a distance to make a tight frictional fitting engagement with the confronting inner wall surfaces 3"-3" of the square tube 2 when the square tube is in a position where the sides thereof are positioned parallel to the corresponding margins 8' of the associated fitting hub face 8 and loosely within a square tube 2 when the sides of the tube are oriented at a 45° angle to the hub face margins 8'. The tube-receiving projections 4b may be made separately from the hub portion 4a and later welded thereto. The cubical hub portion 4a of each connector fitting is preferably of somewhat greater size than the square tubing 2 so that if any of the tube-receiving projections 4b should be welded in a slightly off centered position, none of the edges of the tube 2 will be exposed.

The four flat surfaces 11 interconnecting the two pairs of curved surfaces 10—10 and 10—10 fall along the outlines of a square having margins oriented at 45° with respect to the corresponding margins 8'—8' and 8'—8' of the hub face from which the tube-receiving projection involved extends. Accordingly, the diametrically opposed curved surfaces 10—10 and 10—10 are aligned in directions at right angles to or parallel to the margins of the associated hub face 8. The flat surfaces 11—11 of each tube-receiving projection 4b provide clearance for the passage of a locking tongue 6 at the end of the tube 2 inserted at a 45° angle over a tube-receiving projection 4b.

As illustrated, the curved and flat surfaces 10 and 11 of each tube-receiving projection 4b are interrupted by four, circumferentially spaced grooves 12 centered with respect to the diametrically opposed curved portions 10. The innermost margins of the grooves are defined by radially outwardly facing curved surfaces 12' which fall along the surface of a common cylinder of lesser diameter than and coaxially related to the cylinder along which the curved surfaces 10 fall. The four axially extending flat surfaces 11 truncate the cylindrical surfaces 12' of the grooves 12, so that the surfaces 12' are spaced a greater distance from the longitudinal axis of the tube receiving projection 4b involved than the portion of the flat surfaces 11 truncating the same. Each of the grooves 12 terminates at its outermost margin (i.e., the margin located furthest from the associated hub portion 4a) in locking shoulder 13 whose function is to be described.

The tongue 6 at each end of a square tube 2 is so spaced from the same that when the tube is telescoped fully over one of the tube-receiving projections 4b of the connector fitting 4 so that the end edge of the tube is brought agains the hub face of the connector fitting, the outer edge of the tongue 6 will extend slightly beyond the locking shoulder 13, as shown in FIG. 8 When the tube 2 or the connector fitting 4 is rotated 45° relative to the other of the same from their initially loosely fitting telecoping positions, the curved inner surface 12' of one of the grooves 12 will act as a tongue deforming means which deforms the tongue inwardly to force the tongue into the groove and against the locking shoulder 13, to draw the tube and connector fitting axially together where the end edge of the tube tightly abuts the adjacent hub face forming an abutment shoulder for the end of the tube.

Figures 2, 6A:
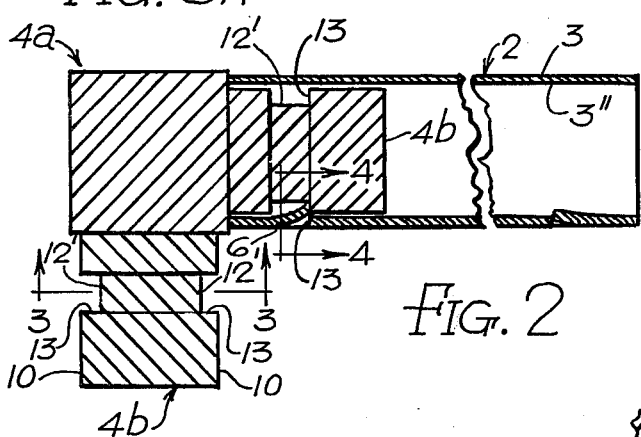
FIG. 2 is a longitudinal sectional view through the tube and the inserted connector fitting shown in FIG. 1, taken along section line 2—2 therein.
FIG. 6A is an enlarged fragmentary view of the locking tongue portion of the tube shown in FIGS. 5 and 6 as viewed from the outside of the tube.
Figure 5:
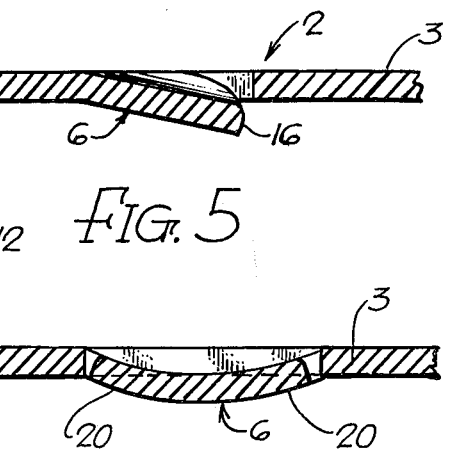
FIG. 5 is a greatly enlarged longitudinal sectional view through the unstressed locking tongue at the right hand end of the tube shown in FIG. 1, taken along section line 5—5 therein.
Figures 3, 4, 6:
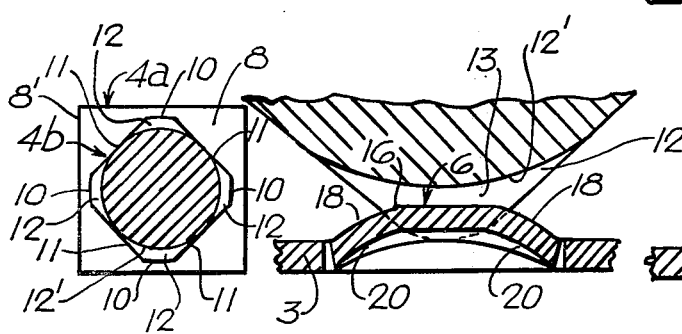
FIG. 3 is a transverse sectional view through the grooved portion of one of the connector fitting projections shown in FIG. 2, taken along section line 3—3 therein.
FIG. 4 is a greatly enlarged, fragmentary sectional view through the locking tongue-forming portion of the tube and the grooved portions of a connector fitting projection receiving the tongue as shown in 2, taken along section line 4—4 therein.
FIG. 6 is a greatly enlarged transverse sectional view through the locking tongue of FIG. 5, taken along section line 6—6 in FIG. 1.

Each locking tongue 6 preferably has the configuration shown in FIGS. 5, 6, and 6A, which show the tongue in its unstressed state, and shown in FIGS. 2 and 4 which shows the tongue in its stressed state. Each tongue 6 preferably inclines inwardly and axially in a direction away from the adjacent open end of the tube 2 and is transversely alongated so that it is much longer in the direction of its width measured transversely of the axis of the tube 2. Most importantly, the tongue preferably has a convex shape as viewed from inside of the tube, so that it presents two laterally outwardly facing curved surfaces 20—20 (FIG. 5). The outer edge of the tongue preferably has a straight marginal portion 16 as shown in FIG. 6A, terminating in rounded portions 18—18 extending to the root or base of the tongue.

In making a frame sub-assembly 19 comprising a tube 2 and a pair of connector fittings 4—4 locked into the opposite ends of the tube 2, the connector fittings 4—4 are initially inserted within the opposite ends of the tube 2 so that the tube-receiving projections involved are in their loosely telescoping positions with respect thereto as shown in FIGS. 7-9. The fittings 4—4 are placed on the floor with an orientation where one of the tube-receiving projections of each connector fitting extends upwardly, as shown in FIG. 7, and the one to be attached to one end of the tube extends longitudinally. Tube 2 is first loosely placed over the latter outwardly extending projections of the connector fittings 4—4. A square tube 2 is placed loosely over each of the upwardly extending tube-receiving projections and a plastic coated wrench 20 having a rectangular slot 22 size to fit closely around the outer surface of the tube 2 is held over the tube 2 with one hand. If one person is assembling the framework, he grabs one of the spare tubes 2 with the other hand and applies a rotational force to the latter spare tube so that the initially angularly related faces of the square tube and the connector fitting hub portion are moved into aligned or parallel positions, where the diametrically opposed curve portions 10—10 of the tube-receiving projection involved will tightly engage the defining walls of the interior of the square tube. He repeats this process with the other spare tube to bring the other connector fitting into tight fitting engagement with the tube. In the process of moving each connector fitting relative to the square tube to interlock the same, a radially outwardly facing surface 12' of one of the grooves 12 will engage one of the curved side faces 20 of the adjacent tube tongue 6 and will deform the same inwardly to cause the tongue to slip into the groove 12 and bear against the locking shoulder 13, thereby forcing the tongue-receiving projection involved tightly axially inwardly the tube.

A horizontal end frame section 25a shown in FIGS. 10 and 11 is formed by placing on the floor in spaced opposed relation a pair of sub-assemblies 19 just described with an exposed tube-receiving projection 4b at each end of each sub-assembly horizontally confronting a similar projection from the other sub-assembly. A square tube 2' is then loosely fitted over each pair of confronting projections. The tubes 2' are then rotated successively by the wrench 20 into positions where the margin of the tube 2' are in alignment with the square margins of the associated connector fitting hub faces.

A framework like that shown in FIG. 11 can be built up from a pair of horizontal frame sections 25a—25a, an intermediate horizontal frame section 25b and various vertical tubes 2 and 2' as shown in FIG. 11. The intermediate frame section 25b is similar to the end frame section 25a—25a except that the frame section 25b has four-way connector fittings 4' each provided with two tube-receiving projections extending from two adjacent vertical faces and two tube-receiving projections extending from oppositely facing faces of the hub of the convertor fitting 4'.

First, a horizontal end frame section 25a is placed on the ground, and vertically extending tubes 2' are placed loosely over upwardly extending tube-receiving projections 4b of the connector fittings 4 at the four corners of the horizontal frame section 25a. Before moving any of the tubes 2' into their tightly fitting positions, the intermediate horizontal frame section 25b is supported loosely upon the top of the latter vertically extending tubes 2'. Then, with the use of the wrench 20, the various tubes 2' are rotated to their tightly fitting positions. In a similar manner, vertical tubes 2 are placed upon the upwardly extending tube-receiving projections 4b' of four-way corner connector fittings 4' of the intermediate frame section 25b, and an upper most horizontal frame section 25a is placed loosely over the latter tubes 2. The tubes 2 extending upwardly from the four-way fittings 4' are then rotated into their tightly fitting positions.

To make more complex framework structures, connector fittings having tube-receiving projections extending from five or six faces of the connector fitting may be utilized.

Since in a commercial framework installation attractiveness is of utmost importance, the tubes 2 and 2' and the various connector fittings are usually coated with a shiny chrome-plating. To avoid the scuffing or scratching the tubes when engaged by the wrench 20, as explained, the wrench 20 is preferably comprised of a metal body 26 (FIG. 13) coated all over with a layer of relatively compressible syntehtic plastic material.

It is thus apparent that the tube and connector fitting of the present invention provides an uniquely, reliable means for insuring a neat close-fitting relationship between the telescoping tube and connector fitting parts, and even under the circumstances where the parts are made to relatively loose tolerances.

It should be understood that numerous modifications may be made in the most perferred form of the invention described without deviating from the broader aspects of the invention.

I claim:

1. In combination with a tube connector fitting for interconnecting substantially square open-ended tubes each having an interior defined by two pairs of orthogonally related parallel flat surfaces spaced apart a given distance, said tube connector fitting comprising a hub portion having tube-receiving projections extending in different directions from said hub portion, said hub portion forming tube end abutment surfaces immediately about the points said tube-receiving projections extend from said hub portion, each of said tube-receiving projections having diametrically opposed portions of maximum spacing which fit loosely within said square tube in one angular position of insertion into the tube and frictionally engaged the interior surfaces of said tube when the inserted connector fitting or tube receiving the same is rotated 45° therefrom, each of said tube-receiving projections having diametrically opposed portions of lesser spacing between said diametrically opposed portions of maximum spacing which portions of lesser spacing provide clearance for the passage of internally projecting flexible resilient locking means on one of the square tubes when the tube connector fitting has said one angular position of insertion with respect thereto, and grooves formed in and extending transversely of the longitudinal axes of said tube-receiving projections which grooves are defined by recessed radially outwardly facing surfaces which at their outermost margins intersect radially outwardly extending tube projection locking shoulders, said grooves being in axial alignment with said diametrically opposed projection portions of maximum spacing, said recessed radially outwardly extending groove surfaces being spaced a greater distance from the center of the associated tube-receiving projections than the portions thereof between said recessed groove surfaces, to form locking projection deforming means when forced against the outer side surfaces of said resilient locking means of one of said tubes upon said 45° rotation of the same; the improvement comprising open-ended square tubes inserted over said connector fitting projections, each of said square tubes having adjacent the opposite ends thereof inwardly projecting flexible resilient tongues extending longitudinally away from the adjacent tube axes and each of which present at each side thereof facing transversely of the longitudinal axis of the tube curved surfaces either of which is engagable by said recessed radially facing groove surface of said fitting when the tube is inserted fully over a fitting projection, each tongue having a length to extend somewhat beyond the point of the connector fitting projection adjacent to where the associated groove-formed locking shoulder is located when the tube is in said fully inserted position so that the adjacent groove surface engages one of said curved surfaces of the adjacent tongue and inwardly deforms and shortens axially said tongue to cause it to enter the adjacent connector fitting projection groove and resiliently engage said groove-forming locking shoulder thereof when the connector fitting or tube is rotated 45° to bring the tube and connector fitting into their frictionally engaging positions, the entry of the tongue into the groove drawing the connector fitting and tube axially together to bring the end of the tube into abutment with said tube end abutment surface of the connector fitting hub portion.

2. The combination of claim 1 wherein said diametrically opposed portions of maximum spacing of each projection are curved surfaces and said diametrically opposed portions of lesser spacing are flat axially extending surfaces.

3. The combination of claim 2 wherein said recessed groove surfaces are truncated by said flat axially extending surfaces.

4. The combination of claim 2 wherein the hub portion of each connector fitting has a cubical shape, said connector fitting projections extend transversely from different square faces of the cubical hub portion, said axially extending flat surfaces of each connector fitting projection being symmetrically positioned with respect to and transverse to the diagonals of the square face of the cubical hub portion from which it extends.

5. The combination of claim 2 wherein the hub portion of each connector fitting has a cubical shape, said connector fitting projections extend transversely from different square faces of the cubical hub portion, and the said curved surfaces of said connector fitting forming said diametrically opposed portions of maximum spacing of each tube-receiving projection being aligned along lines parallel to the square margins of the square hub face from which the projection extends.

6. The combination of claim 1 wherein said diametrically opposed portions of maximum spacing of each projection are outermost curved surfaces falling along the outlines of a cylinder coaxial with the longitudinal axis of the connector fitting projection involved, and said diametrically opposed portions of lesser spacing are flat axially extending surfaces truncating said cylinder.

7. The combination of claim 6 wherein said recessed groove surfaces of each connector fitting projection are cylindrical surfaces coaxially related to but of lesser diameter than said curved cylindrical surfaces of the connector fitting projections, said recessed groove surfaces being truncated by said flat axially extending surfaces.

8. The combination of claim 6 wherein said hub portion of the connector is cubical in shape with each of said tube-receiving projections extending from a different face of the cubical hub portion, and said outermost curved surfaces of each projection falling along the outline of a truncated cylinder extending for the full length of the projections and terminating at the face of the cubical hub portion of the connector fitting.

9. The combination of claim 1 wherein the entire tube connector fitting is a solid all metal member.

10. The combination of claim 1 wherein each of said tongues has a cross-section in a direction transverse to the longitudinal axis of the tube which is of convex shape, to present curved side surfaces for engagement by said recessed groove surfaces when the tube connector fitting or tube is rotated 45° from its initial position.

11. The combination of claim 1 wherein each of said tongues is many times wider in a direction transverse to the longitudinal axis of the tube than the length thereof.

12. The combination of claim 1 wherein each of said tongues has a straight outer end portion to engage said grooveformed locking shoulder along an appreciable extent thereof.

* * * * *